United States Patent
Terkes et al.

(10) Patent No.: US 10,246,131 B2
(45) Date of Patent: Apr. 2, 2019

(54) METHOD FOR CARRYING OUT A PARKING PROCESS OF A MOTOR VEHICLE INTO A TRANSVERSE PARKING SPACE, PARKING ASSISTANCE SYSTEM AND MOTOR VEHICLE

(71) Applicants: Valeo Schalter und Sensoren GmbH, Bietigheim-Bissingen (DE); Volkswagen Aktiengesellschaft, Wolfsburg (DE)

(72) Inventors: Mehmet Terkes, Braunschweig (DE); Tobias Geiger, Bietigheim-Bissingen (DE); Joern Karl Friedrich Lichtenhagen, Bietigheim-Bissingen (DE)

(73) Assignees: Valeo Schalter Und Sensoren GmbH, Bietigheim-Gibbingen (DE); Volkswagen Aktiengesellschaft, Wolfsburg (DE)

(*) Notice: Subject to any disclaimer, the term of this patent is extended or adjusted under 35 U.S.C. 154(b) by 127 days.

(21) Appl. No.: 15/105,598

(22) PCT Filed: Nov. 19, 2014

(86) PCT No.: PCT/EP2014/074972
§ 371 (c)(1),
(2) Date: Jun. 17, 2016

(87) PCT Pub. No.: WO2015/090813
PCT Pub. Date: Jun. 25, 2015

(65) Prior Publication Data
US 2016/0318551 A1    Nov. 3, 2016

(30) Foreign Application Priority Data

Dec. 19, 2013   (DE) .................. 10 2013 114 563

(51) Int. Cl.
*B62D 15/02*         (2006.01)
(52) U.S. Cl.
CPC ......... *B62D 15/027* (2013.01); *B62D 15/028* (2013.01); *B62D 15/0285* (2013.01)
(58) Field of Classification Search
CPC ........................... B62D 15/027; B62D 15/028
See application file for complete search history.

(56) References Cited

U.S. PATENT DOCUMENTS

| 2007/0273554 A1* | 11/2007 | Sakakibara | ........ B62D 15/0275 |
| | | | 340/932.2 |
| 2008/0007618 A1* | 1/2008 | Yuasa | ...................... B60R 1/00 |
| | | | 348/118 |

(Continued)

FOREIGN PATENT DOCUMENTS

| DE | 10 2011 077 173 | 12/2012 |
| DE | 10 2011 086 215 | 5/2013 |

(Continued)

OTHER PUBLICATIONS

International Search Report & Written Opinion for International Application No. PCT/EP2014/074972, filed Nov. 19, 2014. Valeo Schalter Und Sensoren GmbH.

(Continued)

*Primary Examiner* — Jess Whittington
(74) *Attorney, Agent, or Firm* — Louis T. Isaf; Womble Bond Dickinson (US) LLP

(57) ABSTRACT

In one aspect, the present disclosure relates to a method for performing a parking operation of a motor vehicle into a transverse parking space by means of a parking assistance system of the motor vehicle. With the method of the present disclosure, environmental information related to an environment of the motor vehicle can be captured by one or more sensors. The transverse parking space further can be detected by a controller of the parking assistance system (Continued)

Figure 1:
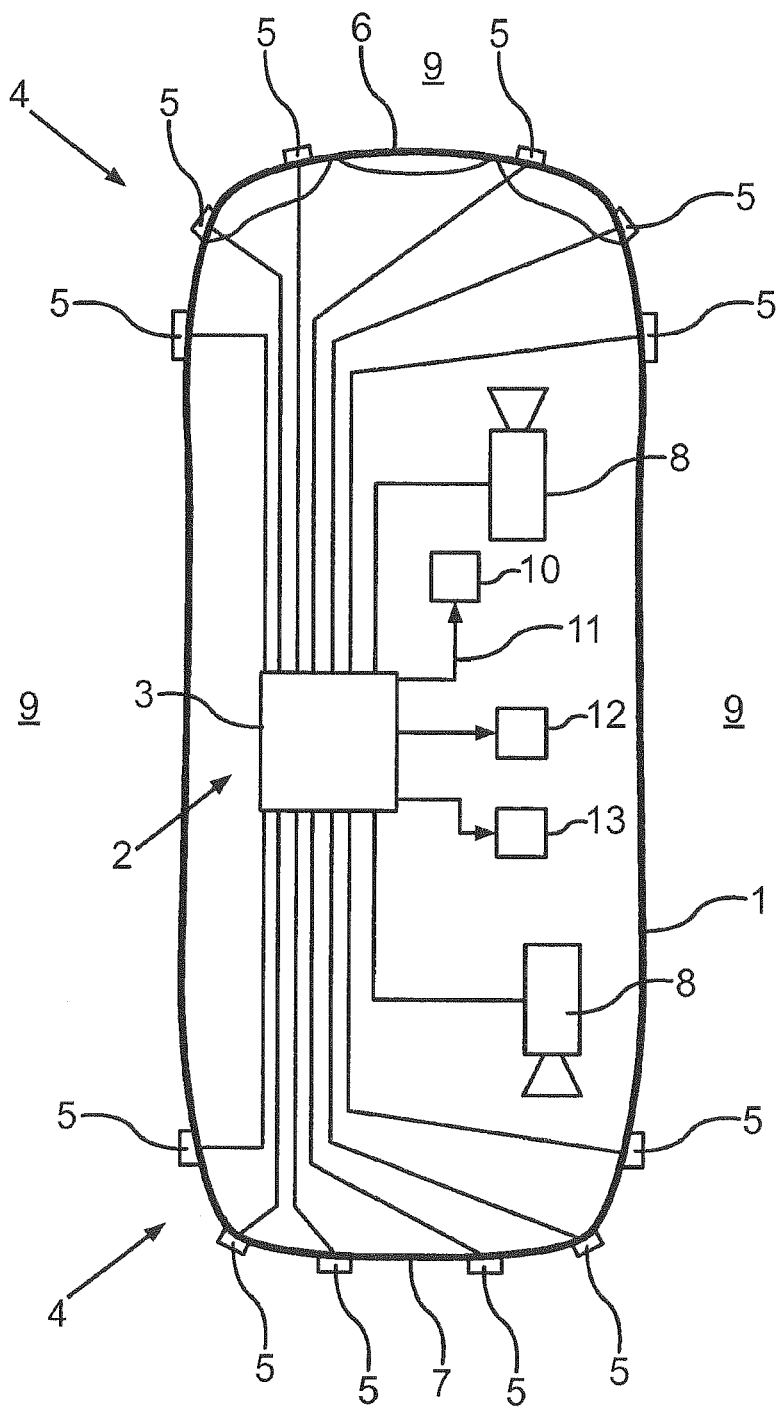

depending on the environmental information, and one or more control signals can be received at a steering system of the motor vehicle. Based upon the one or more control signals received at the steering system, the motor vehicle can be guided from a current position through an entry side of the transverse parking space into the transverse parking space.

13 Claims, 4 Drawing Sheets

(56) References Cited

U.S. PATENT DOCUMENTS

| | | | | |
|---|---|---|---|---|
| 2011/0004375 | A1* | 1/2011 | Hueger | B62D 15/0285 701/41 |
| 2011/0006917 | A1 | 1/2011 | Taniguchi et al. | |
| 2011/0087406 | A1* | 4/2011 | Barth | B62D 15/027 701/41 |
| 2011/0316720 | A1* | 12/2011 | Ghatak | E04H 6/426 340/932.2 |
| 2013/0060421 | A1* | 3/2013 | Kadowaki | B62D 15/027 701/36 |
| 2013/0073119 | A1* | 3/2013 | Huger | B62D 15/027 701/1 |
| 2013/0116879 | A1* | 5/2013 | Huger | B62D 15/0285 701/23 |
| 2013/0162829 | A1* | 6/2013 | Kadowaki | B62D 15/028 348/148 |
| 2014/0081476 | A1* | 3/2014 | Verdugo-Lara | G08G 1/168 701/1 |
| 2015/0291031 | A1* | 10/2015 | Morimoto | B60W 50/12 701/70 |

FOREIGN PATENT DOCUMENTS

| | | |
|---|---|---|
| EP | 2 620 351 | 1/2013 |
| JP | 2009-101774 | 5/2009 |
| JP | 2013-244852 | 12/2013 |
| WO | WO 2010/140458 | 12/2010 |

OTHER PUBLICATIONS

KIPO's Notice of Preliminary Rejection dated Sep. 15, 2017 issued with regards to co-pending Korean patent application No. 10-2016-7019361.

KIPO's Notice of Final Rejection dated Mar. 20, 2018 issued with regards to co-pending Korean patent application No. 10-2016-7019361.

KIPO's Notice of Preliminary Rejection dated May 15, 2018 issued with regards to co-pending Korean patent application No. 10-2016-7019361.

\* cited by examiner

METHOD FOR CARRYING OUT A PARKING PROCESS OF A MOTOR VEHICLE INTO A TRANSVERSE PARKING SPACE, PARKING ASSISTANCE SYSTEM AND MOTOR VEHICLE

The invention relates to a method for performing a parking operation of a motor vehicle into a transverse parking space by means of a parking assistance system of the motor vehicle, wherein environmental information to an environment of the motor vehicle is captured by a sensor device of the parking assistance system and the transverse parking space is detected by a control device of the parking assistance system depending on the environmental information and control signals are delivered at least to a steering system of the motor vehicle, by which the motor vehicle is guided or controlled from a current position through an entry side of the transverse parking space into the transverse parking space. In addition, the invention relates to a parking assistance system for performing such a method as well as to a motor vehicle with such a parking assistance system.

Parking assistance systems or driver assistance devices are already known from the prior art, which assist the driver of a motor vehicle in performing parking operations. In this respect, it is differentiated between so-called semi-autonomous (semi-automatic) systems on the one hand and fully automatic systems on the other hand. Therein, it is common to all of the systems that a potential parking space is detected and a dimension of the parking space is captured and then compared to a stored minimum dimension. If the captured dimension of the detected parking space is at least equal to the minimum dimension, thus, the possibility of the parking operation is signaled to the driver. Then, the system determines the current relative position of the motor vehicle with respect to the parking space and calculates a parking path (parking trajectory), along which the motor vehicle can be parked into the parking space without collision. In semi-autonomous parking assistance systems, it is assigned to the driver to accelerate and to brake. In semi-autonomous parking assistance systems, the longitudinal guidance of the motor vehicle is therefore controlled by the driver himself, while the control of the transverse guidance is effected by the parking assistance system itself by delivering corresponding control signals to a steering system of the motor vehicle. In contrast, in fully automatic parking assistance systems, both the longitudinal guidance and the transverse guidance are automatically performed by the parking assistance system by delivering corresponding control signals both to the steering system and to a power train and a brake system of the motor vehicle. In fully automatic systems, the driver only has to enable the parking operation and also can interrupt it at any time.

A parking assistance system is for example known from the printed matter WO 2008/055567 A1.

For capturing parking spaces, usually, ultrasonic sensors are employed, which are attached in the front area of the motor vehicle at the respective lateral flanks. During passage of the motor vehicle by a potential parking space, the ultrasonic sensor continuously measures the lateral distance of the motor vehicle to obstacles or objects external to vehicle. Based on the progression of the measured values of the ultrasonic sensor as well as considering the traveled path distance, the dimension of the parking space in longitudinal direction of the motor vehicle or in longitudinal direction of the roadway as well as the relative position of the parking space with respect to the motor vehicle can then be determined. This applies both to longitudinal parking spaces, the longitudinal axis of which is substantially oriented parallel to the roadway, and to transverse parking spaces, the longitudinal axis of which extends perpendicularly or at an acute angle to the roadway. Such a detection method is for example known from the document EP 0 305 907 B1.

However, parking assistance systems are also known, in which the detection of a parking space is also possible without previous passage of the motor vehicle by the parking space. Thus, the document DE 10 2005 046 827 A1 for example describes a method for parking assistance, in which the dimensions of the parking space are determined in a not yet terminated, at least partial positioning of the vehicle in the parking space and a trajectory or parking path of the vehicle to the termination of the parking operation is determined. Here, the parking operation is started by the driver himself and terminated by the parking assistance system in automated manner only after detection of the parking space.

From the printed matter DE 10 2011 122 421 A1, a method for parking a motor vehicle into a transverse parking space is known, in which a starting position of the motor vehicle relative to the parking space is first reached and the vehicle longitudinal axis forms an angle less than 60° with the parking space longitudinal axis in the starting position. In this starting position, respective flanks of vehicles can be detected, by which the parking space is laterally bounded. Considering the detected lateral flanks, a parking trajectory is then determined from the starting position to a target position and the motor vehicle is guided along the parking trajectory in automated manner. Accordingly, the determination of the target position in the parking space is here effected based on the detected flanks of the lateral vehicles.

A method for controlling a parking assistance system of a vehicle is further known from the document DE 10 2007 027 438 A1 Here, a target position in a parking space is determined depending on whether or not a vehicle occupant is detected on the passenger side.

In a method according to EP 1 249 379 B1, after a first activation on the part of the driver, the environment of the vehicle is continuously scanned for detecting a target position and the current vehicle position is continuously determined. Based on the determined environmental and positional information, control signals for taking the vehicle into the target position are then determined. Thereafter, depending on a second activation on the part of the driver, control commands depending on the control signals are delivered to the power train and/or the brake system and/or the steering of the motor vehicle, whereby the vehicle is guided into the target position independently of the driver.

A method for assisting a driver of a motor vehicle in parking into a transverse parking space is furthermore known from the document DE 10 2009 039 084 A1. Environmental information is captured by a sensor device and a parking trajectory is determined depending on the environmental information, along which the motor vehicle is forward parked into the transverse parking space at least in semi-autonomous manner. Therein, a target position of the vehicle in the parking space is determined such that all of the points of the vehicle center longitudinal axis have the same distance to lateral boundaries of the parking space. In determining the target position in the parking space, thus, the parking assistance system orients itself by the lateral objects, which laterally immediately bound the parking space.

A method for parking a vehicle into a parking space without previous passage by the parking space is moreover known from the document DE 10 2010 056 064 A1.

In the prior art, for performing a semi-autonomous or fully automatic parking operation of a motor vehicle into a transverse parking space, it is therefore overall assumed that a lateral boundary of the parking space can be detected, by which the parking space is bounded in parking space transverse direction. Only after detection of the lateral boundary, be it of another vehicle, be it of a marking, a target position or parking position in the parking space can be determined and a corresponding parking trajectory can be calculated, along which the motor vehicle can then be semi-autonomously or fully automatically guided by the parking assistance system. In situations, in which extended lateral boundaries are not detected and the transverse parking space is bounded for example by a pillar or the like at least on one side, the determination of the actual orientation of the parking space and thus the determination of the target position and correspondingly the determination of a suitable parking trajectory are not possible. Such scenarios for example occur in parking garages, in which multiple transverse parking spaces are separated from each other exclusively by pillars. Furthermore, the circumference is to be considered as disadvantageous in the prior art that the determination of the target position in the parking space is only insufficient based on the lateral boundaries because it can for example occur that a vehicle bounding the parking space is obliquely parked, i.e. at an acute angle with respect to the parking space longitudinal direction. This then results in the fact that the ego motor vehicle is also obliquely parked into the detected parking space by the parking assistance system.

It is the object of the invention to demonstrate a solution, how in a method of the initially mentioned kind, the parking operation of the motor vehicle can be particularly reliably performed by the parking assistance system, in particular also in absence of lateral boundaries or with relatively small, point-shaped lateral boundaries, for instance in the form of a pillar or the like.

According to the invention, this object is solved by a method, by a parking assistance system as well as by a motor vehicle having the features according to the respective independent claims. Advantageous implementations of the invention are the subject matter of the dependent claims, of the description and of the figures.

A method according to the invention serves for performing a parking operation of a motor vehicle into a transverse parking space by means of a parking assistance system of the motor vehicle. By a sensor device of the parking assistance system, environmental information to an environment of the motor vehicle is—in particular continuously—captured. The transverse parking space is detected by a control device of the parking assistance system depending on the environmental information. Then, the control device delivers control signals at least to a steering system of the motor vehicle to control the motor vehicle from a current position through an entry side of the transverse parking space into the transverse parking space. Based on the environmental information, a rear boundary is detected by the parking assistance system, which bounds the transverse parking space in parking space longitudinal direction on a rear side opposing the entry side. A target orientation of the motor vehicle for a target position in the parking space is then determined based on the rear boundary by the parking assistance system.

Accordingly, the effect according to the invention is achieved in that a rear boundary bounding the transverse parking space in parking space longitudinal direction—for example a wall and/or a marking—is detected based on the environmental information and used to set a target orientation of the motor vehicle for the target position or parking position by the parking assistance system itself, i.e. an orientation of the vehicle longitudinal axis with respect to the parking space longitudinal axis. The setting of the target orientation of the motor vehicle or of the parking position can therefore be particularly reliably effected even in absence of extended lateral boundaries or also in situations, in which the determination of the target orientation based on lateral boundaries is not possible. The method according to the invention in particular proves particularly advantageous in situations, in which the transverse parking space is bounded by a point-shaped object at least on one side, such as for example by a pillar or the like. In such situations, the orientation of the motor vehicle in the target position is determined based on the rear boundary. A further advantage of the method according to the invention is in that the motor vehicle can always be parked perpendicularly to the rear boundary, namely independently on whether or not a vehicle laterally bounding the parking space is obliquely parked.

By a "transverse parking space", in particular a parking space is understood, the longitudinal axis or longitudinal direction of which is oriented perpendicularly to a roadway adjoining to the parking space. In particular, the transverse parking space can be a parking spot in a parking garage or a garage.

The control signals are delivered at least to the steering system of the motor vehicle by the control device. This means that the parking assistance system is formed for performing an at least semi-autonomous parking operation. If the parking operation is fully automatically performed, thus, corresponding control signals can also be delivered to a power train and/or a brake system of the motor vehicle to also perform the longitudinal guidance of the motor vehicle in automated manner.

In the method according to the invention, the parking operation can be performed forward and/or rearward. Thus, the method can be applied for forward parking and/or for rearward parking.

The target orientation for the target position in the transverse parking space is preferably set such that the vehicle longitudinal axis forms an angle in a range of values from 80° to 100°, in particular in a range of values from 85° to 95°, with the rear boundary in the target position. Preferably, the target orientation is a perpendicular orientation of the vehicle longitudinal axis relative to the rear boundary. Thus, the motor vehicle can always be parked centrally in the transverse parking space.

The detection of the rear boundary can also be used to determine the depth of the transverse parking space and thus the target position of the motor vehicle in the parking space. For example, the target position can be determined such that the motor vehicle is positioned in a preset distance to the rear boundary in this target position.

As the rear boundary, an elongated object, in particular a guardrail and/or a wall, can be detected in an embodiment. Such a boundary can be detected with the aid of a distance sensor without much effort, for example by means of an ultrasonic sensor. Since such distance sensors are usually present in today's vehicles as default, thus, the employment of further sensors with the disadvantages associated therewith is unnecessary.

Additionally or alternatively, a marking applied to the ground can also be detected as the rear boundary. Such a marking can for example be detected based on image data of a camera. In particular, this embodiment is particularly advantageous if a further parking space is located behind the rear boundary in parking space longitudinal direction and these two parking spaces are not separated from each other by a guardrail or the like. Here, the control device detects the marking, by which the two parking spaces are separated from each other.

In an embodiment, it can be provided that it is checked by the control device based on the environmental information if the transverse parking space is bounded by an elongated or extended lateral object in parking space transverse direction, which extends along the transverse parking space and besides it and thus allows determination of the orientation of the parking space and thus also of the target orientation of the motor vehicle in the target position. If such a lateral object is detected, the target orientation can be determined based on the rear boundary and/or based on the lateral object. Optionally, both the rear boundary and the lateral object can be used for setting the target orientation. In contrast, if a lateral object is not detected, which allows determining the target orientation, the target orientation can be determined solely based on the rear boundary. By this additional check, the determination of the target orientation or the parking position in the parking space can be even more reliably and adequately effected.

If the transverse parking space is detected by the control device, this detection is preferably signaled to the driver. Now, the driver has the possibility of activating the at least semi-autonomous parking operation or denying the activation. Thus, the parking operation is performed by the parking assistance system on condition that the driver performs a corresponding confirming input at an input device. This confirming input is received by the control device, whereupon the parking operation is then activated. The activation of the parking operation can optionally also be correspondingly signaled. A further precondition for the activation of the parking operation can also involve that the motor vehicle stands still and/or a predetermined gear is engaged, namely in particular the reverse gear for rearward parking and/or the first gear for forward parking.

The detection of the transverse parking space can basically also be effected without passage of the motor vehicle by the parking space. Thus, the transverse parking space can for example be detected in the standstill of the motor vehicle and/or upon approach of the motor vehicle to the parking space based on the current environmental information. However, it is also possible to detect the parking space based on environmental information, which is captured during a passage of the motor vehicle by the parking space.

Preferably, a parking trajectory from the current position at least to an intermediate position between the current position and the target position is determined by the control device after detecting the transverse parking space. Then, the motor vehicle is guided along the determined parking trajectory at least in semi-autonomous manner by the control device and thus can be parked along the parking trajectory into the transverse parking space without collision.

With respect to the detection of the transverse parking space by the control device, two scenarios can basically occur: In the detection of the transverse parking space, the rear boundary of the parking space can also be detected at the same time such that the detection of the transverse parking space is also effected based on the rear boundary. This is in particular possible if image data is provided by means of a camera as the environmental information. Based on such image data, namely, the rear boundary can also be detected from a relative large distance. However, it can also occur on the other hand that the rear boundary cannot yet be detected at the time of detection of the transverse parking space. This can for example be the case if distance values are acquired by means of a distance sensor, for example an ultrasonic sensor, as the environmental information. Namely, the range of an ultrasonic sensor is usually ca. 4 m and can therefore be smaller than the length of the motor vehicle itself and thus the length of the transverse parking space. In such cases, the transverse parking space can for example be detected based on lateral boundaries even if they are constituted by a pillar or another point-shaped object. Optionally, however, the parking space can also only be detected when the motor vehicle is already partially within the parking space and the parking assistance system can detect the rear boundary.

If the transverse parking space is detected based on at least one boundary laterally bounding the transverse parking space in parking space transverse direction—for example an object and/or a marking—and the rear boundary is only detected upon traversing the parking trajectory and thus only during the already begun parking operation, thus, the parking trajectory can be corrected and/or completed after detecting the rear boundary by the control device based on the current environmental information or based on the detected rear boundary. Thus, the parking operation can also be at least semi-autonomously begun without the information about the rear boundary and then nevertheless be reliably terminated by correcting the orientation of the motor vehicle based on the detected rear boundary.

In contrast, if the rear boundary is already detected in the detection of the transverse parking space, the parking trajectory from the current position to the target position can be determined considering the rear boundary. During the parking operation, the environmental information can be continuously captured, and it can be continuously checked by the control device based on the respectively current environmental information if a difference between the position of the rear boundary assumed or determined originally in the calculation of the parking trajectory on the one hand and an actual position of the rear boundary determined based on the current environmental information on the other hand exceeds a preset threshold. If the threshold is exceeded, the originally determined parking trajectory can be corrected based on the current environmental information.

Generally stated, thus, in an embodiment, it can be provided that the environmental information is continuously captured during the parking operation by the control device and the parking trajectory is corrected, in particular continuously corrected, by the control device based on the current environmental information. Thus, the parking operation can be particularly reliably performed and be exactly terminated even with errors in the initial parking trajectory calculation.

As already explained, distance values can be captured by means of at least one distance sensor, in particular by means of a plurality of distance sensors, of the sensor device as the environmental information. Thus, distance sensors, for example ultrasonic sensors, already present anyway can also be used for capturing environmental information.

For capturing environmental information, the control device can also include a camera, by means of which image data or images of the vehicle environment are provided. Based on image data, the rear boundary can be detected already early or from a larger distance and thus be taken into account in the calculation of the parking trajectory.

The invention also relates to a parking assistance system for performing a parking operation of a motor vehicle into a transverse parking space, including a sensor device for capturing environmental information to an environment of the motor vehicle, and including a control device, which detects the transverse parking space depending on the environmental information and delivers control signals at least to a steering system of the motor vehicle, by which the motor vehicle is guided from a current position through an entry side of the transverse parking space into the transverse parking space. Based on the environmental information, the control device detects a rear boundary, which bounds the transverse parking space on a rear side opposing the entry side in parking space longitudinal direction. The control device then determines a target orientation of the motor vehicle for a target position in the transverse parking space based on the rear boundary.

A motor vehicle according to the invention, in particular a passenger car, includes a parking assistance system according to the invention.

The preferred embodiments presented with respect to the method according to the invention and the advantages thereof correspondingly apply to the parking assistance system according to the invention as well as to the motor vehicle according to the invention.

Further features of the invention are apparent from the claims, the figures and the description of figures. All of the features and feature combinations mentioned above in the description as well as the features and feature combinations mentioned below in the description of figures and/or shown in the figures alone are usable not only in the respectively specified combination, but also in other combinations or else alone.

Below, the invention is explained in more detail based on individual preferred embodiments as well as with reference to the attached drawings.

There show:

FIG. 1 in schematic representation a motor vehicle with a parking assistance system according to an embodiment of the invention; and FIGS. 2 to 5 various parking scenarios for explaining a method according to an embodiment of the invention.

A motor vehicle 1 illustrated in FIG. 1 is for example a passenger car. The motor vehicle 1 includes a parking assistance system 2, which is formed for detecting parking spaces as well as for performing semi-automatic or fully automatic parking operations. In fully automatic parking assistance systems 2, the system takes over both the longitudinal guidance and the transverse guidance of the motor vehicle 1, while only the transverse guidance and thus the steering is controlled in automated manner in semi-automatic or semi-autonomous systems, while the driver himself has to accelerate and brake.

The parking assistance system 2 includes a central control device 3, which can for example include a digital signal processor and/or a microcontroller. The control device 3 is coupled to a sensor device 4, which has a plurality of distance sensors 5, in particular ultrasonic sensors, in the embodiment, which are disposed distributed both at a front bumper 6 and at a rear bumper 7. Therein, at least one distance sensor 5 is disposed at the respective lateral flank of the motor vehicle 1. Optionally, the sensor device 4 can include at least one camera 8, namely in particular a front camera and/or a reversing camera or rearview camera.

The sensor device 4 captures environmental information to an environment 9 of the motor vehicle 1. Therein, there are provided distance values by the distance sensors 5 and/or image data by the at least on camera 8 as the environmental information. The environmental information is communicated to the central control device 3, which can perform the semi-autonomous or fully automatic parking operations based on the environmental information.

The control device 3 is coupled to a steering system 10 of the motor vehicle 1 and can deliver control signals 11 to the steering system 10 to perform the transverse guidance of the motor vehicle 1. In a fully automatic parking assistance system 2, the control device 3 is also coupled to a power train 12 or a drive engine as well as a brake system 13 of the motor vehicle 1 and thus can also perform the longitudinal guidance of the motor vehicle 1, i.e. can accelerate and brake in automated manner.

Figure 2:
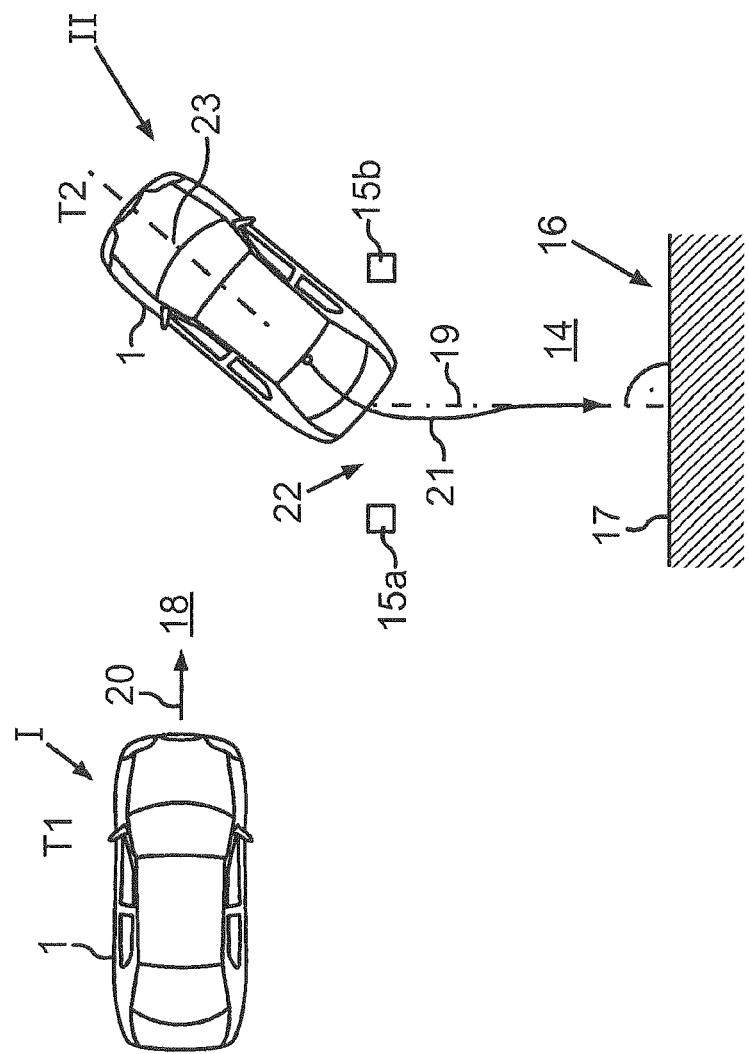

A first parking scenario, in which the motor vehicle 1 is at least semi-autonomously parked into a transverse parking space 14, is illustrated in FIG. 2. The motor vehicle 1 is for example in a parking garage, in which multiple such transverse parking spaces 14 are present, which are only separated from each other by pillars 15a, 15b in lateral manner and thus in parking space transverse direction. The transverse parking space 14 is bounded by a rear boundary 17, a wall in the embodiment, in parking space longitudinal direction 19 on a rear side 16. This rear boundary 17 opposes an entry side 22, through which the motor vehicle 1 is parked into the transverse parking space 14.

At the point of time T1, the motor vehicle 1 is in a position I on a roadway 18, which immediately adjoins to the transverse parking space 14 and extends perpendicularly to the parking space longitudinal axis or parking space longitudinal direction 19. The motor vehicle 1 moves on the roadway 18 according to the arrow representation 20 and passes by the transverse parking space 14. With respect to the detection of the transverse parking space 14 by the parking assistance system 2, now, two embodiments are basically provided: on the one hand, the parking space 14 can be detected during the passage by the control device 3 detecting the two pillars 15a, 15b and evaluating a distance between the pillars 15a, 15b. On the other hand, the parking space 14 can be detected based on the pillars 15a, 15b also in the standstill and/or upon approach of the motor vehicle 1 to the parking space 14. If the motor vehicle 1 is in a position II at a later point of time T2, in which for example the rear of the motor vehicle 1 points towards the transverse parking space 14, thus, the two pillars 15a, 15b can also be detected in the standstill based on the distance values of the distance sensors 5 and the transverse parking space 14 can be recognized. The at least semi-automatic parking operation can then be started from the position II.

If the transverse parking space 14 is detected by the control device 3, this detection is signaled to the driver. The driver now has the possibility of activating the at least semi-autonomous parking operation or denying the activation. Thus, the parking operation is performed by the parking assistance system 2 on condition that the driver performs a corresponding confirming input at an input device. The activation of the parking operation is correspondingly signaled. A further precondition for the activation of the parking operation can also involve that the motor vehicle stands still and/or a predetermined gear is engaged, namely in particular the reverse gear for rearward parking and/or the first gear for forward parking.

Independently of how the transverse parking space 14 is detected, the control device 3 calculates a parking trajectory 21 only schematically indicated in FIG. 2, along which the motor vehicle 1 can be parked into the transverse parking space 14 through the entry side 22 without collision, wherein the entry side 22 opposes the rear boundary 17 or the rear side 16 in parking space longitudinal direction 19. With respect to the determination of the parking trajectory 21, there are also multiple scenarios possible: if the rear boundary 17 is detected—for example based on the distance values and/or based on the image data—by the control device 3 in the current position II, thus, the rear boundary 17 can already be taken into account in the first-time calculation of the parking trajectory 21. The parking trajectory 21 is determined such that a target orientation of the motor vehicle 1 in a target position (i.e. parking position) in the parking space 14 is oriented perpendicularly to the rear boundary 17 and thus parallel to the parking space longitudinal direction 19. If the rear boundary 17 cannot yet be detected at the point of time T2 or in the position II, the parking trajectory 21 can first be determined solely based on the pillars 15*a*, 15*b* at least up to an intermediate position. As soon as the rear boundary 17 is then detected during parking, the originally determined parking trajectory 21 can be corrected and/or completed up to the target position.

Optionally, the parking trajectory 21 can also be set such that the motor vehicle 1 is parked into the transverse parking space 14 in multiple moves. Further moves can also be added afterwards—i.e. during parking—if it is detected based on the current environmental information that terminating the parking operation without collision is not possible with only one move and correction of the parking trajectory 21 has to be performed.

Independently of when the rear boundary 17 is actually detected, the sensor device 4 can continuously capture the environmental information and the control device 3 can continuously examine based on the respectively current environmental information whether or not a correction of the originally calculated parking trajectory 21 is required. Herein, the control device 3 for example examines if a difference between the originally assumed position of the transverse parking space 14 and a position determined based on the current environmental information exceeds a preset threshold. If the threshold is exceeded, the parking trajectory 21 can be corrected. A correction of the parking trajectory 21 can also be effected if a new obstacle is detected based on the environmental information, which was not taken into account in the initial calculation of the original parking trajectory 21.

Thus, the continuous correction of the parking trajectory 21 means that the motor vehicle 1 can "feel its way" into the transverse parking space 14 without collision at least in semi-autonomous manner. It is essential that the target orientation or the orientation of the motor vehicle 1 in the target position is set based on the rear boundary 17, in particular perpendicular to the rear boundary 17. This means that the vehicle longitudinal axis 23 forms a right angle with the rear boundary 17 or is oriented parallel to the parking space longitudinal direction 19 in the target position in the transverse parking space 14.

Figure 3:
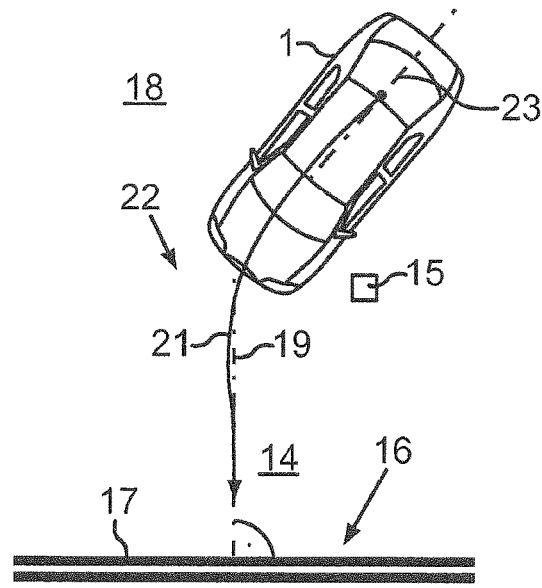

In FIG. 3, a scenario is shown, in which the motor vehicle 1 is forward parked into a transverse parking space 14, the rear boundary 17 of which is constituted by a guardrail. The transverse parking space 14 is laterally bounded only by a single pillar 15. Here too, the target orientation of the motor vehicle 1 in the target position cannot be set based on a lateral object since the transverse parking space 14 is not laterally bounded by an elongated or extended object. Here, the parking space 14 is detected based on the pillar 15 and optionally also based on the rear boundary 17. This detection can be effected both in passage by the transverse parking space 14 and in the standstill and/or in approach to the parking space 14 and thus without previous passage. In the scenario according to FIG. 3, it is particularly advantageous if the rear boundary 17 can already be early detected and in particular can also be used for detecting the transverse parking space 14. This can in particular be performed based on image data of the at least one camera 8.

In the scenario according to FIG. 3 too, a parking trajectory 21 from the current position into the target position or at least into an intermediate position is determined. This parking trajectory 21 can also be continuously corrected during parking by considering the respectively current environmental information. The determination of the target orientation in the target position is effected based on the rear boundary 17.

Figure 4:
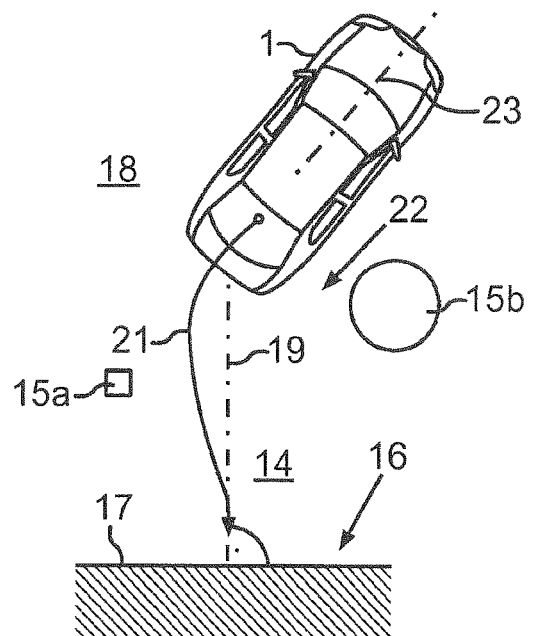
Figure 5:
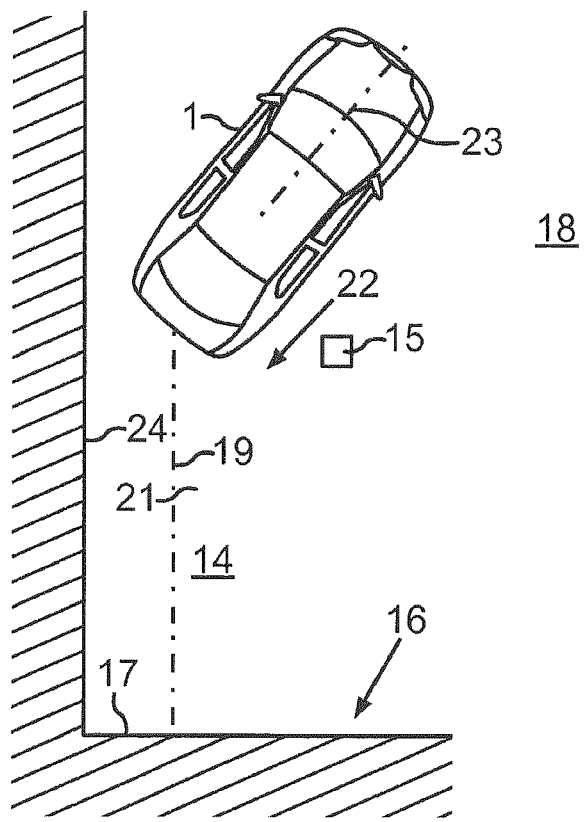

The continuous correction of the parking trajectory 21 proves advantageous in particular also in the scenario according to FIG. 4, in which the transverse parking space 14 is laterally bounded by pillars 15*a*, 15*b*, which are positioned on different level along the parking space longitudinal direction 19. In the detection of the transverse parking space 14—in particular during a passage—first only a width of the transverse parking space 14 perpendicular to the parking space longitudinal direction 19 is captured here. The exact position of the pillars 15*a*, 15*b* can then only be captured during the parking operation and the parking trajectory 21 can optionally be corrected. Optionally, the parking operation can here be terminated in multiple moves. As in the other scenarios, here too, the target orientation for the target position is determined based on the rear boundary 17 such that the vehicle longitudinal axis 23 extends parallel to the parking space longitudinal direction 19.

It can also be examined by the control device 3 if the transverse parking space 14 is bounded laterally and thus in parking space transverse direction by an elongated or extended object, which also allows setting the target orientation. Such a scenario is for example illustrated in FIG. 5. Here, the transverse parking space 14 is laterally bounded by an elongated object 24 (here a wall) on the one hand and by a pillar 15 on the other hand. Here, the parking space 14 is detected by the control device 3 based on the elongated object 24 and the pillar 15 as well as optionally based on the rear boundary 17. In setting the target orientation for the target position, the elongated object 24 and/or the rear boundary 17 are taken into account. In order to park the motor vehicle 1 in the scenario according to FIG. 5 in the transverse parking space 14, a multi-move parking trajectory can be determined. The parking operation can for example be terminated in at least three moves. Here too, the parking trajectory can be continuously corrected and/or completed based on the respectively current environmental information.

The invention claimed is:

1. A method for performing a parking operation of a motor vehicle into a transverse parking space by means of a parking assistance system of the motor vehicle, comprising:
   capturing environmental information related to an environment of the motor vehicle by one or more sensors of the parking assistance system;
   detecting the transverse parking space by a controller of the parking assistance system depending on the environmental information, and determining, by the controller, a parking trajectory between a current position and a target position;
   transmitting control signals at least to a steering system of the motor vehicle; and
   based upon one or more control signals received at the steering system, guiding the motor vehicle along the parking trajectory from the current position through an entry side of the transverse parking space into the transverse parking space, wherein a rear boundary is detected by the parking assistance system based on the environmental information, the rear boundary at least partially bounds the transverse parking space on a rear side of the transverse parking space opposing the entry side of the transverse parking space in a longitudinal direction therealong, and a target orientation of the motor vehicle for the target position in the transverse parking space is determined based on the rear boundary, wherein to determine the target orientation the controller examines if the transverse parking space is bounded by a lateral object in a transverse direction along the parking space based on the environmental information, and if the lateral object is detected, the target orientation is determined based on the rear boundary and based on the lateral object, and if the lateral object is not detected, the target orientation is determined solely based on the rear boundary, and wherein the controller determines a difference between a position of the rear boundary assumed or determined in an original determination of the parking trajectory and a position of the rear boundary determined based on current environmental information, and wherein if the difference between the position of the rear boundary determined or assumed in the original determination of the parking trajectory and the position of the rear boundary determined based on the current environmental information exceeds a preset threshold, the parking trajectory is corrected or updated based on the current environmental information.

2. The method according to claim 1, wherein the target orientation is determined such that the vehicle longitudinal axis forms an angle in a range of 80° to 100° with the rear boundary in the target position.

3. The method according to claim 1, wherein an elongated object is detected as the rear boundary.

4. The method according to claim 1, wherein a marking applied to a ground is detected as the rear boundary.

5. The method according to claim 1, wherein the parking operation is performed by the parking assistance system on condition that a confirming input performed by a driver at an input device is received by the controller.

6. The method according to claim 1, wherein the parking trajectory from the current position at least to an intermediate position between the current position and the target position is determined by the controller.

7. The method according to claim 6, wherein if the transverse parking space is detected based on at least one boundary laterally bounding the transverse parking space in the transverse direction and the rear boundary is only detected in traversing the parking trajectory, the parking trajectory is corrected and/or completed after detection of the rear boundary by the controller based on the current environmental information.

8. The method according to claim 6, wherein during the parking operation, the parking trajectory is continuously corrected by the control device based on the current environmental information.

9. The method according to claim 1, wherein the environmental information comprises distance values captured by at least one distance sensor.

10. The method according to claim 1, wherein the environmental information comprises image data captured by at least one camera.

11. A parking assistance system for performing a parking operation of a motor vehicle into a transverse parking space, comprising:

at least one sensor that captures environmental information of an environment of the motor vehicle; and a controller that detects the transverse parking space depending on the environmental information, determines a parking trajectory between a current position and a target position, and delivers control signals at least to a steering system of the motor vehicle to facilitate guidance of the motor vehicle along the parking trajectory from a current position through an entry side of the transverse parking space into the transverse parking space, wherein the controller detects a rear boundary based on the environmental information, the rear boundary at least partially bounds the transverse parking space on a rear side of the transverse parking space opposing the entry side of the transverse parking space in a longitudinal direction therealong, and determines a target orientation of the motor vehicle for the target position in the transverse parking space based on the rear boundary, wherein to determine the target orientation the controller examines if the transverse parking space is bounded by a lateral object in a transverse direction along the parking space based on the environmental information and if the lateral object is detected, the target orientation is determined based on the rear boundary and based on the lateral object, and if the lateral object is not detected, the target orientation is determined solely based on the rear boundary, and wherein the controller determines a difference between a position of the rear boundary assumed or determined in an original determination of the parking trajectory and a position of the rear boundary determined based on current environmental information, and wherein if the difference between the position of the rear boundary determined or assumed in the original determination of the parking trajectory and the position of the rear boundary determined based on the current environmental information exceeds a preset threshold, the parking trajectory is corrected or updated based on the current environmental information.

12. A motor vehicle comprising the parking assistance system according to claim 11.

13. A method for performing a parking operation of a motor vehicle into a transverse parking space with a parking assistance system in communication with the motor vehicle, comprising:

capturing environmental information related to an environment of the motor vehicle by one or more sensors of the parking assistance system;

searching for lateral objects and/or a rear boundary based on the captured environmental information using the parking assistance system, wherein the rear boundary at least partially bounds the transverse parking space on a rear side of the transverse parking space that opposes an entry side of the transverse parking space in a longitudinal direction therealong;

if one or more lateral objects and the rear boundary are detected based on the environmental information, determining a parking trajectory based upon the rear boundary and the one or more lateral object objects, if no lateral objects are detected and the rear boundary is detected, determining the parking trajectory only based upon the detected rear boundary, and if one or more lateral objects are detected and the rear boundary is not initially detected, determining the parking trajectory based upon the one or more detected lateral objects and updating the parking trajectory based on the rear boundary upon detection thereof;

if a difference between a position of the rear boundary determined based on current environmental information and a position of the rear boundary determined or assumed in a previous determination of the parking trajectory exceeds a preset threshold, correcting or updating the parking trajectory based on the current environmental information; and transmitting one or more control signals to a steering system of the motor vehicle to facilitate guidance of the motor vehicle through the entry side of the transverse parking space and into the transverse parking space based on the determined parking trajectory with the steering system of the motor vehicle.

* * * * *